R. DELAUNAY-BELLEVILLE.
SELF PROPELLING TORPEDO.
APPLICATION FILED MAY 7, 1913.
1,098,786.
Patented June 2, 1914.
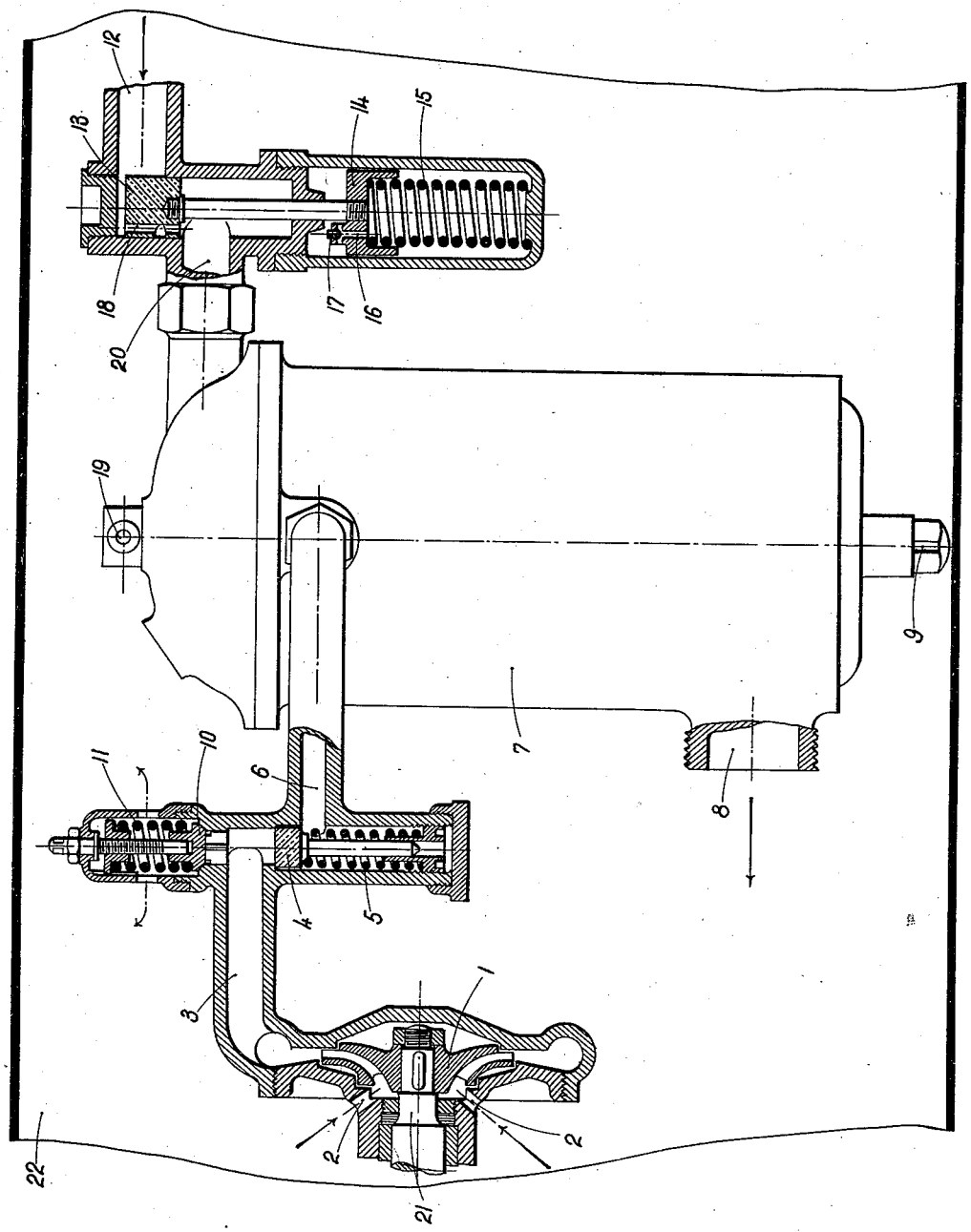
Witnesses.
E. C. Schuermann.
Inventor.
Robert Delaunay-Belleville

UNITED STATES PATENT OFFICE.

ROBERT DELAUNAY-BELLEVILLE, OF ST.-DENIS, FRANCE, ASSIGNOR TO SOCIÉTÉ ANONYME DES ETABLISSEMENTS DELAUNAY-BELLEVILLE, OF ST.-DENIS, FRANCE, A CORPORATION OF FRANCE.

SELF-PROPELLING TORPEDO.

1,098,786. Specification of Letters Patent. Patented June 2, 1914.

Application filed May 7, 1913. Serial No. 766,111.

*To all whom it may concern:*

Be it known that I, ROBERT DELAUNAY-BELLEVILLE, citizen of the French Republic, residing at St.-Denis, Department of the Seine, in France, have invented certain new and useful Improvements in Self-Propelling Torpedoes; and I do hereby declare the following to be a full, clear, and exact description of the invention, such as will enable others skilled in the art to which it appertains to make and use the same.

A method has heretofore been proposed, of controlling torpedoes having a turbine supplied with a compressed gaseous fluid obtained from a generator in which water is vaporized by mixing it with the combustion gases and which is provided with a device for regulating the quantity of water atomized. Owing to the relatively great quantity of water consumed by the generator a device has been devised permitting of the use of sea water directly. This device comprised a discharging valve on the discharge of the pump so as to reject the excess of water delivered by the pump in case the consumption of water by the generator has been reduced in view of the torpedo being launched under reduced power.

The invention has for its object a device adaptable to self-propelled torpedoes of the above type.

According to this invention, water is supplied to the generator by a centrifugal pump mounted directly on the shaft of the driving turbine and the discharge piping of this pump comprises besides the discharge valve above referred to, a water-tight piston preventing the water from flooding the interior of the torpedo when, in trial firing, the latter sinks on finishing its course. For this purpose the watertight piston uncovers the conduit giving access to the generator only under a certain pressure regulated by a spring; the latter being of such strength that during normal operation the pressure of the pump is largely superior to the resistance of this spring.

As the torpedo has to be immersed in order that the pump should discharge, there is a delay in the distribution of water on starting, and moreover the water tight piston prevents even a fraction of the combustion gases from escaping in starting, through the suction of the water pump. On the other hand, to avoid the centrifugal pump having to overcome too great resistance when it starts, the air distributed by the pressure regulator should reach the generator in small quantities only during the starting of the centrifugal pump. For this purpose a movable piston formed with narrow apertures and integral with a liquid dash-pot is located at the admission to the generator and allows, at the beginning only a small quantity of air to pass through these apertures. This piston moves gradually under the action of the forward pressure of the air and only gradually opens the admission orifice of the generator.

The accompanying drawing illustrates by way of example a device embodying the invention.

The centrifugal pump 1 mounted on the end of the shaft 21 of the turbine, sucks in water from the immersed hull of the torpedo 22 through orifices 2 and discharges the water through the pipe 3. The piston 4 descends under the pressure of the water, compressing the spring 5 and uncovers the pipe 6 admitting to the generator 7. The compressed fluid formed in the generator passes to the turbine distributer, not illustrated through a pipe 8 and a suitable connector.

The spindle 9 actuates the valve which controls the distribution of water in the generator. When the torpedo is launched with reduced power, the valve connected to the spindle 9 covers more than half the area of the water admission passage to the generator. To avoid the discharge pressure of the pump rising as a result of this regulation, the valve 10 equilibrated by a spring 11, is arranged to open as soon as the water pressure begins to rise and permits the discharge of the excess of water delivered by the pump.

On launching the torpedo, the air from the reservoir after having traversed the pressure regulator, reaches the pipe 12 and depresses the piston 13 which descends gradually being retarded by the piston 14 located in the cylinder 15 filled with liquid. This liquid escapes under the action of pressure, through a small orifice 16 provided with a controlling screwed spindle 17 which enables the damping action to be regulated. A certain quantity of air reaches the generator on starting through openings 18 formed in the piston 13 before the latter has uncovered the opening 20 which gives access to the generator. Petroleum is admitted to the generator through a pipe 19 and the ignition is effected by a device not illustrated in the drawing. The turbine is started therefore, under small power which subsequently gradually increases. The gases of the generator fill all the empty spaces and especially the pipe 6. The watertight piston 4 is then caused to bear upon its seat and opposes any leakage through the openings of the pump. The movement of the piston 13 is regulated in such a manner that it begins to uncover the pipe 20 giving access to the generator, only when the torpedo is immersed, the hull flooded and the centrifugal pump 1 has effected its first suction, this pump has only a small resistance to overcome to depress the watertight piston 4, the start being effected under reduced pressure in the generator.

When the torpedo sinks, in practice firing, on reaching the end of its course, it is advisable to prevent the water from flooding all interior compartments of the torpedo; that is why the watertight piston has been provided, the spring 5 of which can support the maximum immersion pressure in firing ranges without uncovering the pipe 6 admitting to the generator.

I claim:

1. In a torpedo generator, the combination of a conduit adapted to conduct water to the generator, means to force the water therethrough, and a valve located in said conduit adapted to open only under predetermined pressure of the water to admit the same to the generator and said valve adapted when closed to prevent the escape of gases from the generator.

2. In a torpedo generator, the combination of a conduit adapted to conduct water to the generator, means to force the water therethrough, means disposed in said conduit to permit the water to pass to the generator only when said water is under predetermined pressure, an air conduit associated with the generator, and means to retard the admission of air to the generator when the means for forcing the water through the conduit is starting, whereby rise of pressure in the generator in the conduit is retarded during the starting of said means.

3. In a torpedo generator, the combination of a conduit adapted to conduct water to the generator, means to force the water therethrough, means disposed in said conduit to permit the water to pass to the generator only when said water is under predetermined pressure, an air conduit associated with the generator, and automatic means to retard the admission of air to the generator when the means for forcing the water through the conduit is starting, whereby rise of pressure in the generator in the conduit is retarded during the starting of said means.

In testimony whereof I affix my signature, in presence of two witnesses.

ROBERT DELAUNAY-BELLEVILLE.

Witnesses:
HANSON C. COXE,
EMILE KLOH.

---

Copies of this patent may be obtained for five cents each, by addressing the "Commissioner of Patents, Washington, D. C."